United States Patent [19]

Wepfer

[11] Patent Number: 4,583,584
[45] Date of Patent: Apr. 22, 1986

[54] SEISMIC SNUBBER ACCOMMODATING VARIABLE GAPS IN PRESSURE VESSELS

[75] Inventor: Robert M. Wepfer, Wilkinsburg, Pa.

[73] Assignee: Westinghouse Electric Corp., Pittsburgh, Pa.

[21] Appl. No.: 662,649

[22] Filed: Oct. 19, 1984

[51] Int. Cl.$^4$ ............................. F28F 7/00; G21C 9/00
[52] U.S. Cl. ........................................ 165/82; 165/81; 376/285
[58] Field of Search ................ 165/81, 82; 188/268; 267/122, 140.1; 376/285, 302, 304, 381

[56] References Cited

U.S. PATENT DOCUMENTS

| | | | |
|---|---|---|---|
| 2,919,883 | 1/1960 | Murphy | 267/122 |
| 3,438,430 | 4/1969 | Kestemont | 165/81 |
| 3,771,499 | 11/1973 | Marroni, Jr. et al. | |
| 3,819,060 | 6/1974 | Kendall et al. | 188/268 |
| 3,947,007 | 3/1976 | Pelat | 267/140.1 |
| 4,029,178 | 6/1977 | Tschift | |
| 4,102,522 | 7/1978 | Munz | |
| 4,173,512 | 11/1979 | Meier et al. | |
| 4,381,735 | 5/1983 | Brunner | |

FOREIGN PATENT DOCUMENTS

| | | | |
|---|---|---|---|
| 1261606 | 2/1968 | Fed. Rep. of Germany | 376/304 |
| 1228610 | 4/1971 | United Kingdom | |

OTHER PUBLICATIONS

Elevation View of Current Tube Support Plate Radial Support Scheme: R. Wepfer, 4/3/84.

Primary Examiner—Charles T. Jordan
Assistant Examiner—Richard W. Wendtland
Attorney, Agent, or Firm—Daniel C. Abeles

[57] ABSTRACT

A plunger element which slides axially in a bore in a dashpot element secured to the internals of a steam generator is biased against the shell of the pressure vessel by a series of Belleville springs. The plunger and dashpot element form a chamber having a volume which varies as the width of the gap between the pressure vessel shell and internals changes due to differential thermal expansion, and pressure expansion of the shell. A collapsible reservoir provides an incompressible fluid to the variable volume chamber under urging of the ambient pressure in the pressure vessel through a metering passageway to maintain the chamber full of fluid. The metering passageways are sized relative to the viscosity of the fluid such that fluid seeps between the reservoir and variable volume chamber as the gap width varies in response to thermal and pressure changes, but an inconsequential amount of fluid flows through the passageways in response to seismic shock loading and therefore, seismic forces are transmitted through the resulting rigid connection between the shell and the internals.

12 Claims, 7 Drawing Figures

SEISMIC SNUBBER ACCOMMODATING VARIABLE GAPS IN PRESSURE VESSELS

BACKGROUND OF THE INVENTION

1. Field of the Invention

This invention relates to apparatus which provides a direct load path for seismic forces between the shell and internals of a pressure vessel despite variations in the spacing between the shell and the internals due to differences in thermal expansion of the components and to expansion of the shell under pressure.

2. Prior Art

Nuclear steam generators and other pressure vessels must be able to withstand seismic events without damage. The accelerations in these events can create loads on the internals, in the case of steam generators, the tube bundle and supports, which are transmitted to the shell. Any gaps which occur between the shell and the internals lead to higher loads being imposed on the internals than if there were no gaps due to dynamic impacting. For current model steam generators, radial gaps of only 0.10 inches result in a 100% increase in load to the tube supports over the no-gap condition. Reducing the load requires a device which can move, since the gap size varies during heatup and cooldown of the vessel due to differential thermal expansion of the shell and the internals and due to pressure expansion of the shell. Under normal conditions in the steam generator of a pressurized water reactor (PWR) power plant, the device is submerged in slightly subcooled water at temperatures near 520° F., and must reliably survive the 40-year design life of the steam generator.

Under current practice, tube support plates which support the tube bundle in a PWR steam generator are braced in the radial direction by a series of angularly spaced radially-directed elements. These elements include a support block welded into the wrapper. Jacking screws are inserted through threaded holes in the jacking block to align and support the wrapper and are then welded in place. The tube support plates are then inserted and wedges are driven in the unheated shop condition between the tube supports and the jacking block and the wedges are welded to the wrapper. When heating and pressurizing of the steam generator occur, gaps due to thermal mismatches may occur between the tube support plates and the wedges, and gaps due to pressure and thermal expansion differentials may occur between the jacking screws and the shell which combine to lead to higher loading on the internals from seismic events.

SUMMARY OF THE INVENTION

According to the present invention, a direct load path is provided for seismic forces between the shell member and internal members of a pressure vessel by apparatus which includes a dashpot element and a plunger element which slides within a recess in the dashpot element and forms with the dashpot element a variable volume chamber. One of the elements is secured to one of the pressure vessel members. In the preferred embodiment, the dashpot element is welded to the cylindrical wrapper surrounding the internals. The other element, in the preferred embodiment the plunger element, is biased against the other member, i.e. the shell of the pressure vessel, by compression spring means. A collapsible reservoir for an incompressible fluid is connected to the variable volume chamber by a metering passageway. As the pressure vessel shell and internals move apart due to differential thermal expansion and pressure expansion of the shell, the spring means maintains the plunger in contact with the internals, thus enlarging the variable volume chamber. Pressure within the pressure vessel acting on the collapsible reservoir forces fluid through the metering passageway to keep the variable volume chamber full of fluid. During cooldown, fluid is forced back into the collapsible reservoir by the contraction of the shell toward the internals.

The size of the metering passageway is such that the fluid moves freely between the reservoir and chamber at the slow rates of movement between the shell and internals associated with the temperature and pressure changes. However, it is small enough, relative to the viscosity of the fluid, that an inconsequential amount of fluid flows in and out of the chamber at the frequency of the seismic vibrations. Thus, the plunger, the dashpot and the incompressible fluid in the variable volume chamber act as a solid element between the shell and the internals at the frequency of the seismic vibrations, whereas fluid seeps into or out of the chamber as required at the frequency of the thermal and pressure changes to maintain the chamber full of fluid.

BRIEF DESCRIPTION OF THE DRAWINGS

A full understanding of the invention can be gained from the following description read in conjunction with the accompanying drawings in which.

DESCRIPTION OF THE PREFERRED EMBODIMENTS

The invention will be described as applied to a steam generator in a pressurized water reactor (PWR) nuclear power plant; however, it is to be understood that it is also applicable to other types of pressure vessels having internals which must be protected from seismic loads. This would include, but is not limited to, the reactor vessel which houses the reactor core.

Figure 1:
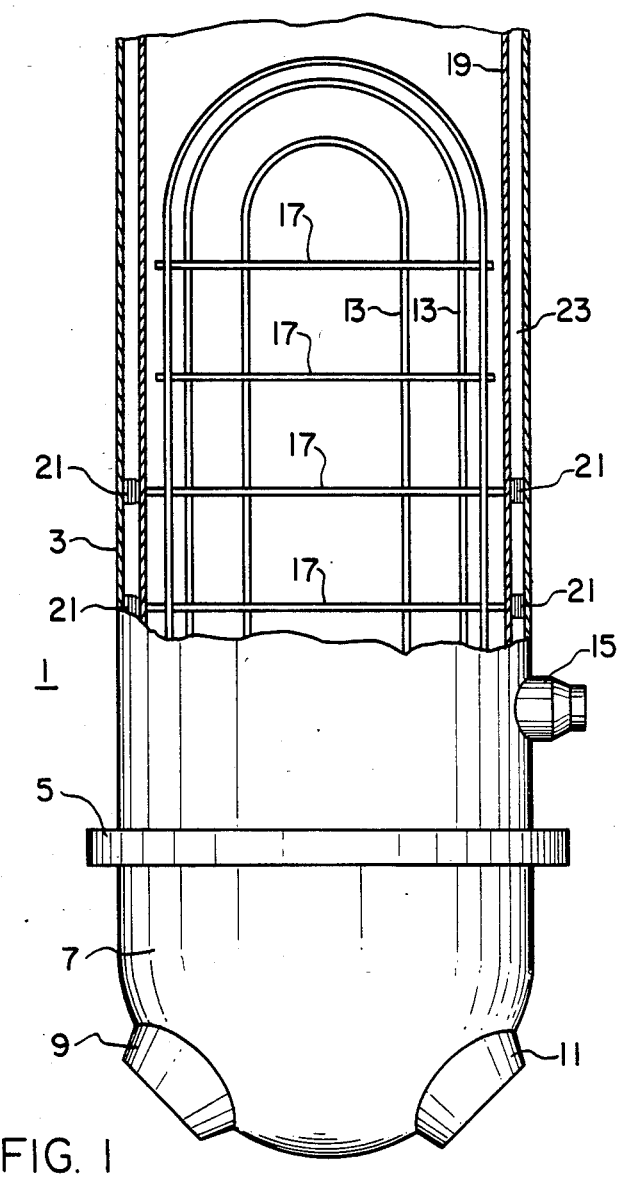
FIG. 1 is a fragmentary elevational view with parts broken away of a steam generator for a PWR power plant incorporating the present invention.

Referring to FIG. 1, the steam generator 1 for a PWR has a generally cylindrical shell 3 which terminates below a horizontal tube sheet 5 in a hemispherical housing 7 having an inlet 9 and an outlet 11 for reactor coolant. Reactor coolant enters inlet 9 circulates through hundreds of U-shaped tubes 13 (only three shown for clarity) extending upward from the tube sheet 5 and is discharged through the outlet 11 in a manner well-known in the art. Feedwater entering through feedwater inlet 15 circulates in the upper portion of the shell around the U-shaped tubes 13 which carry the hot reactor coolant and is converted to steam which rises into demisters (not shown) above the U-shaped tubes before being discharged for use in driving a turbine-generator combination.

The structure which supports the U-shaped tubes 13 inside the shell 3 includes tube support plates 17. Surrounding the U-shaped tubes 13 and tube support plates is a cylindrical wrapper 19. Collectively, these components are referred to as the internals. Devices 21 according to this invention for providing a direct load path for seismic forces between the internals and the shell 3 are angularly distributed around the gap 23 between the wrapper 19 and the shell 3 at the support plates 17 which extend radially outward to the wrapper.

Figure 2:
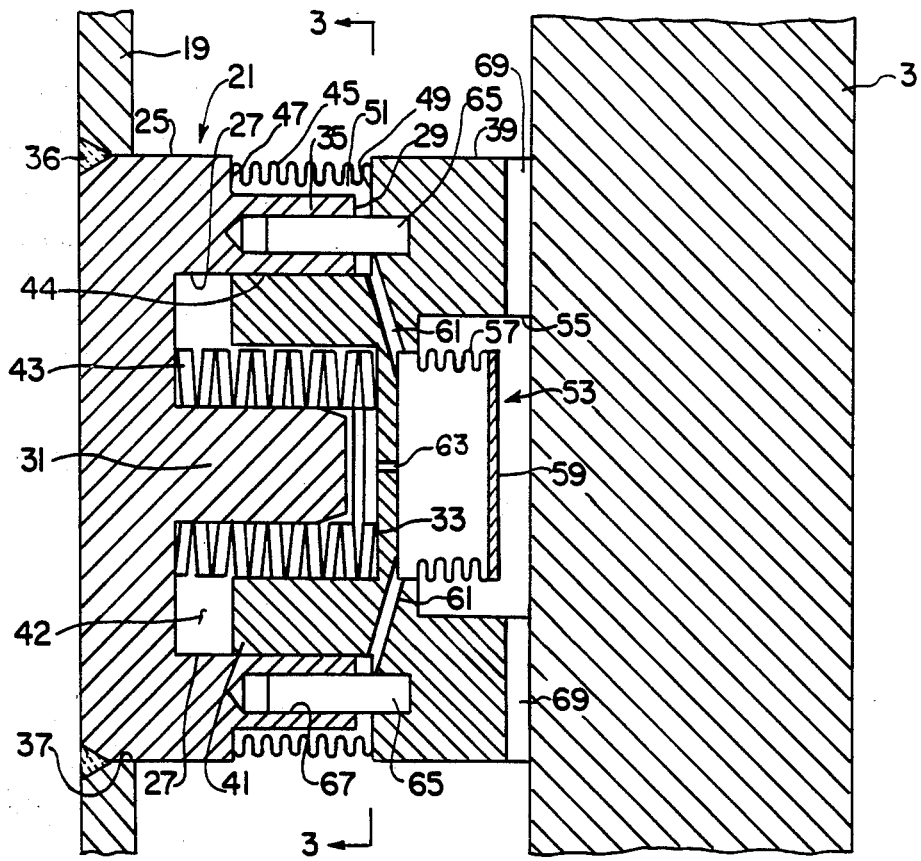
FIG. 2 is a vertical, longitudinal section through one embodiment of a device according to the invention taken along the line 2—2 in FIG. 3.
Figure 3:
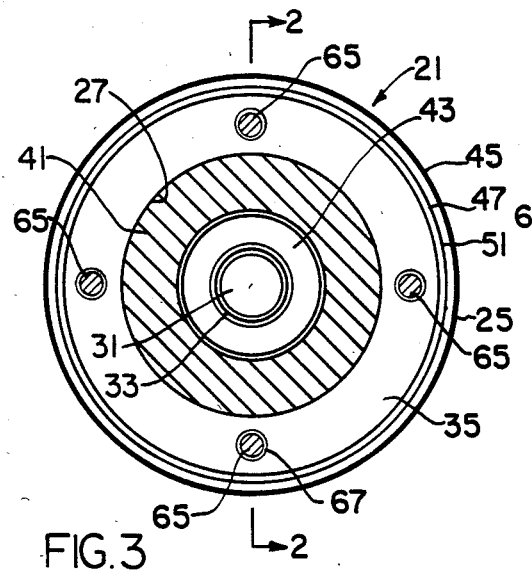
FIG. 3 is a vertical transverse section through the device of FIG. 2 taken along the line 3—3 in FIG. 2.
Figure 4:
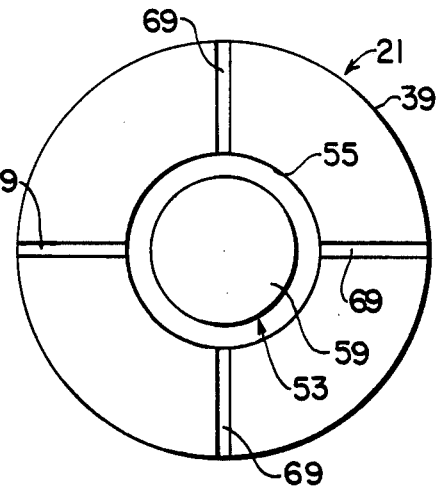
FIG. 4 is an end view of the device of FIGS. 2 and 3.

A preferred form of the device according to the invention is shown in FIGS. 2 through 4. The device 21 includes a cylindrical dashpot element 25 having an annular bore 27 in one end 29 between a central boss 31 tapered at the end 33 and an annular collar 35. The dashpot element 25 is welded as at 36 in an opening 37 in the wrapper 19.

A cylindrical plunger element 39 has a sleeve 41 of reduced diameter on one end which is axially slidable in the annular bore 27 in the dashpot element 25 to form a variable volume chamber 42. The inside diameter of the sleeve 41 is larger than the diameter of boss 31 which provides space within the chamber 42 for a series of Belleville springs 43 which bias the plunger element 39 against the shell 3 of the pressure vessel. A metal bellows seal 45 welded to the peripheries of the shoulder 47 formed by the collar 35 on dashpot element 25 and the shoulder 49 formed by the sleeve 41 on plunger element 39 form with these shoulders and the collar and sleeve another chamber 51 that surrounds and seals the moving parts.

A collapsible reservoir 53 for a working fluid is mounted in the bottom of a counterbore 55 in the free end of the plunger element 39. This collapsible reservoir 53 includes a metal bellows 57 and a removable cap 59 through which the reservoir may be serviced. One, or two (as shown), or more passageways 61 extend from the collapsible reservoir 53 to the chamber 51 to allow movement of fluid in either direction. The sealing surfaces of bore 27 and sleeve 41 are machined to form a metering passageway 44 through which fluid may pass from the chamber 51 to the chamber 42. If desired, an alternative or additional metering passageway 63 can be provided between the reservoir 53 and the annular bore 27 in which the sleeve 41 slides. A series of pins 65 (four shown) extending axially from the plunger element 39 slide within axially-oriented passages 67 in the dashpot element 25 to prevent relative rotation of the parts. Radial grooves 69 in the end of plunger 39 abutting the shell 3 allow the ambient pressure in the vessel to act upon the bellows 57 of the collapsible reservoir 53. Other provisions, such as radial bores through the plunger 39, can be made for equalizing the pressure in bore 55 with the ambient vessel pressure.

In operation, the collapsible reservoir 53 is filled with an incompressible fluid. Water is a suitable working fluid since the feedwater in which the device is submerged is subcooled. The Belleville springs 43 spread the plunger element 39 and dashpot element 25 to bridge the gap 23 between the wrapper 29 and the shell 3 and maintain the plunger element in firm contact with the shell. As the radial distance between the shell 3 and wrapper 19 increases due to differential thermal expansion and pressure expansion of the shell, the variable volume chamber 42 increases in volume. The ambient pressure in the vessel acting on the collapsible reservoir 53 allows fluid to flow from the reservoir through the passageways 61 and then through the metering passageway 44 and/or metering passageway 63 if provided, to keep the chamber 42 full of fluid. As the gap 19 decreases upon cooling of the parts and/or due to a reduction in pressure within the vessel, fluid seeps back to the reservoir 53 through these same passageways 44 and 61 (and 63 if provided). Should at any time, a seismic event occur, the viscosity of the fluid taken with the size of the passageway 44 (and 63 if provided) is such that essentially no fluid passes through the metering passageways under the shock loads and the dashpot element 25, plunger element 39, and fluid in the variable volume chamber 42 form in effect, a rigid connection through which the seismic forces are passed between the shell and the internals.

Figure 5:
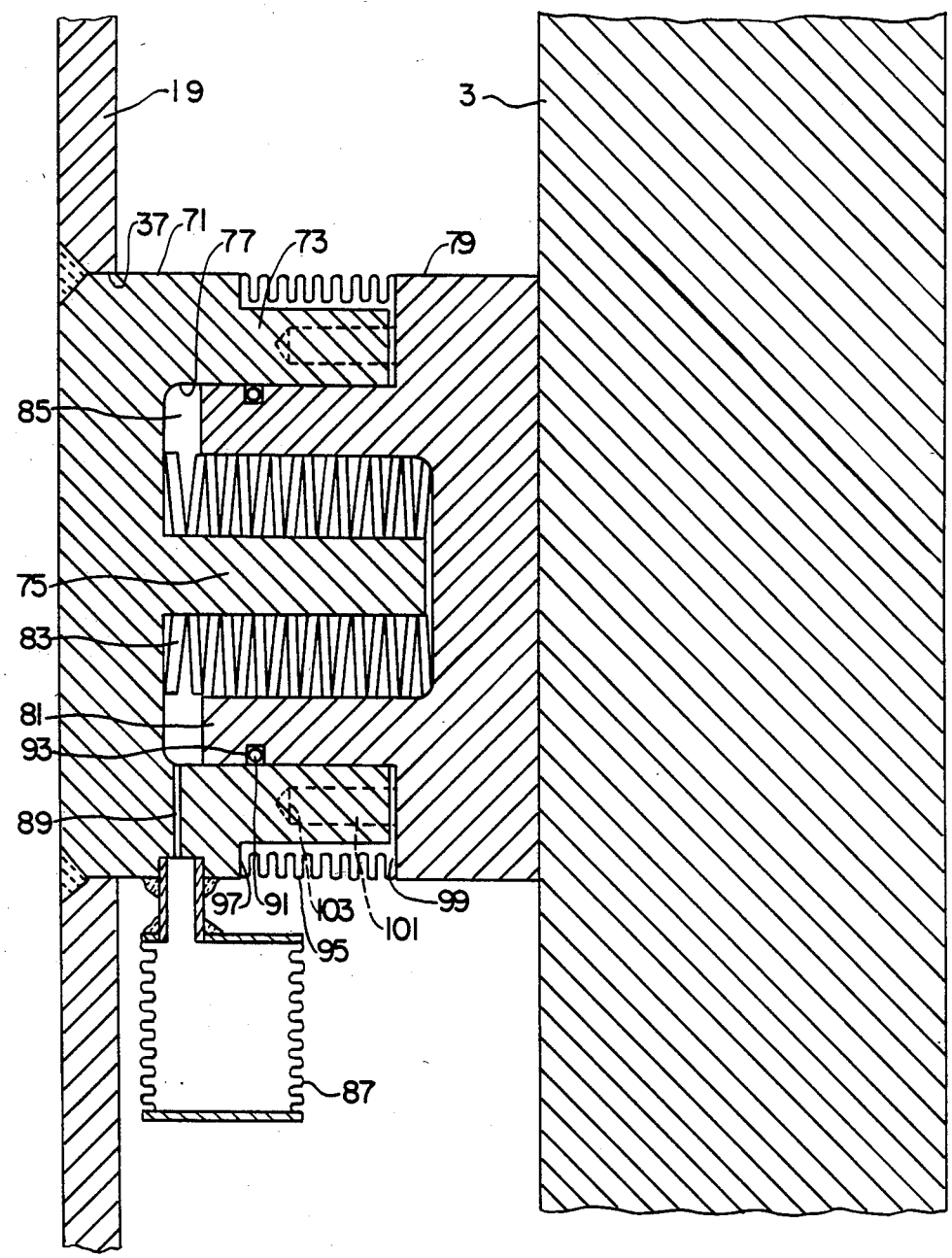
FIG. 5 is a vertical, longitudinal section through another embodiment of a device according to the invention.

Another embodiment of the invention is illustrated in FIG. 5 where again, one end of a cylindrical dashpot element 71 is welded in a bore 37 in the wrapper 19. An annular collar 73 and an axially extending boss 75 define an axial bore 77 in the other end of the dashpot element 71. A cylindrical plunger element 79 has an axially extending sleeve 81 of reduced diameter which slides within the bore 77 in the dashpot element 71. A series of Belleville springs 83 mounted on the boss 75 biases the plunger 79 against the shell 3 of the pressure vessel. In this configuration, the bore 77 in the dashpot element 71 and the sleeve 81 on the plunger element 79 form a variable volume chamber 85. A collapsible reservoir 87 similar to the reservoir 53 discussed above is welded to the cylindrical side of dashpot element 71 and a metering passageway 89 permits the flow of an incompressible fluid between the collapsible reservoir 87 and the variable volume chamber 85. Again, the dimensions of this metering passageway 89 are such that fluid can seep through it to maintain the chamber 85 full of fluid as the width of the gap 19 changes due to differential thermal expansion of the shell and internals and due to pressure expansion or contraction of the shell, but an inconsequential amount of fluid passes through it in response to seismic shock loads.

An "O" ring seal 91 provided in annular groove 93 in the sleeve 81 provides a seal for the variable volume chamber 85. In order to prevent debris et cetra from getting into the device, a metal bellows seal 95 is welded to the peripheries of shoulders 97 and 99 on the dashpot element 71 and plunger element 79 respectively. Guide pins 101 extending axially from the shoulder 99 on plunger element 79 slide within axial bores 103 in the collar 73 on dashpot element 71 to maintain alignment of the parts. The embodiments of the invention shown in FIG. 5, operates in the same manner as that of FIGS. 2 through 4 to eliminate the gap between the pressure vessel shell and internals and to provide a direct load path therebetween for seismic forces.

Figure 6:
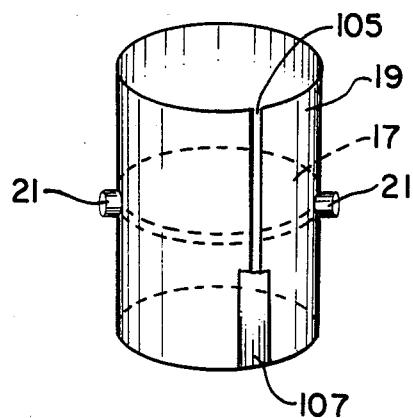
FIG. 6 is a schematic diagram illustrating an arrangement for preventing a radial gap from developing between the wrapper and the tube support plates in a steam generator using the device of this invention.
Figure 7:
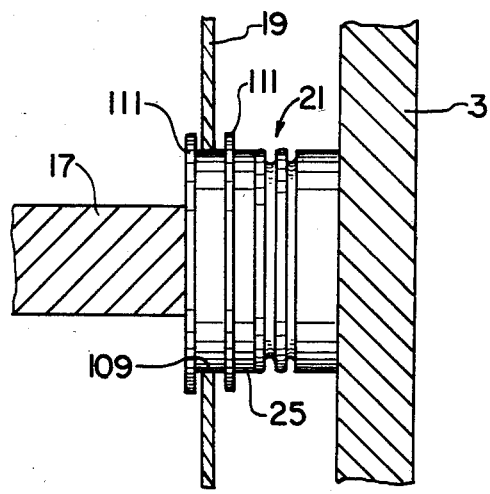
FIG. 7 is a vertical section through a portion of a PWR steam generator illustrating an alternative arrangement for mounting the device of the invention.

The tube support plates 17 of the steam generator normally abut against the inner surface of the wrapper 19. Wedges, not shown, are used to assure a snug fit and to provide some initial compression of the device 21. With the device 21 welded to the wrapper, the coefficients of expansion of the wrapper and the support plates can be matched to prevent a gap from development therebetween during heatup. Another approach is to have the coefficient of thermal expansion of the wrapper 19 less than that of the support plates 17 and provide the wrapper with a longitudinal gap 105 down its length such that the wrapper can expand circumferentially with the support plates as shown schematically in FIG. 6. An overlapping sealing strip 107 (shown partially broken away for clarity) prevents the flow of steam or water through the gap 105. In still another arrangement illustrated in FIG. 7, the dashpot 25 would not be welded to the wrapper 19 but would be radially slidable in a bore 109 in the wrapper 19. A pair of axially spaced radial flanges 111 on the dashpot element 25 loosely secure the device 21 to the wrapper so that the ends bear against the edge of the support plate 17 and the shell 3. Again, a wedge, not shown, can be used between the support plate 7 and the device 21 to apply a preload to the springs. By angularly spacing three or more devices 21 around each support plate 17, seismic forces in any direction in the horizontal plane are transmitted between the wrapper 19 and the shell and support plates. If desired, a spring or other type of mechanical biasing means could be used to maintain pressure on the collapsible reservoir to assist the ambient pressure in the steam generator in keeping the variable volume chamber of the device full of fluid.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. Apparatus for providing a direct load path for seismic forces between the cylindrical shell member of a pressure vessel and internal members within the pressure vessel and which accommodates for variations in the spacing between said members resulting from the difference in thermal expansion coefficients of the members and due to radial expansion of the shell member when the pressure vessel is pressurized, said apparatus comprising:

a dashpot element defining a recess therein;
   a plunger element axially slidable in the recess of the dashpot element, said elements forming an enclosed chamber of variable volume;
   means securing one of said elements to one of said shell and internal members;
   biasing means for biasing said elements apart such that the other element bears against the other member; and
   a collapsible reservoir for an essentially incompressible fluid connected to one of said elements and exposed to ambient pressure in said pressure vessel, said one element defining a metering passage between said collapsible reservoir and said variable volume enclosed chamber through which the incompressible fluid passes from the reservoir to the chamber to keep said chamber full of fluid under the urging of the ambient pressure in the pressure vessel as the spacing between the shell member and the internal members increases as a result of the difference in the coefficients of thermal expansion between the shell and internal members and the radial expansion of the shell member under pressure and as the biasing means maintains said other element in contact with said other member to increase the volume of said enclosed chamber, and through which fluid is returned to the collapsible reservoir as the members cool and the pressure in said vessel is reduced, said metering passage being sized such that essentially no fluid passes therethrough as a result of seismic vibrations and hence, said apparatus provides a direct load path through the dashpot and plunger elements and the essentially incompressible fluid for the seismic forces despite variations in the distance between the shell and the internal members due to differential thermal expansion and pressure in the pressure vessel.

2. The apparatus of claim 1 wherein said dashpot element is cylindrical with an axially extending annular bore in one end surrounding an axially extending boss, wherein said plunger element has an annular sleeve which axially slides in the annular bore in the dashpot element, and wherein said biasing means is hollow cylindrical compression spring means which surrounds said boss and bears against the bottom of said annular bore in the dashpot element and the plunger element.

3. The apparatus of claim 2 wherein said hollow cylindrical compression spring means is a series of Belleville springs.

4. The apparatus of claim 2 wherein one of said elements includes at least one axially extending guide pin and the other element defines an axially extending guide passage in which said guide pin is slidably received to prevent relative rotation between the two elements.

5. The apparatus of claim 2 wherein said plunger element is also cylindrical and including a bellows seals between the peripheries of the cylindrical ends of the plunger element and the dashpot element.

6. The apparatus of claim 5 wherein said collapsible reservoir is connected to the cylindrical side of one of said elements.

7. The apparatus of claim 5 wherein said collapsible reservoir is connected to said other element in an axial bore in the end thereof which bears against said other member.

8. The apparatus of claim 2 wherein said annular bore in the dashpot element forms with the annular sleeve on the plunger element said variable volume enclosed chamber.

9. The apparatus of claim 8 including mechanical biasing means for applying a force to the collapsible reservoir to assist the ambient pressure in the pressure vessel in urging fluid from the collapsible reservoir through the metering passage into the variable volume chamber.

10. Apparatus for providing a direct load path for seismic forces between a first member comprising the cylindrical shell of a steam generator and a second member comprising the internals within the shell, and which accommodates for the variations in the spacing between said members resulting from the difference in thermal expansion coefficients of the members and due to radial expansion of the first member when the steam generator is pressurized, said apparatus comprising:

a cylindrical dashpot element secured at one end to one of said members and having an annular bore in the other end thereof defined by an axially extending collar and a central, axially extending boss;
   a cylindrical plunger element having an annular sleeve of reduced diameter which extends axially from one end thereof and is slidably received in the annular bore in the dashpot element, and having a bore in the other end thereof;

hollow compression spring means surrounding said boss and bearing against the bottom of the annular bore in said dashpot element and against the plunger element to bias the plunger element against said other member;

a bellows seal secured to the periphery of said other end of the dashpot element and the periphery of the first end of the plunger element, said plunger element and dashpot element defining an enclosed chamber having a volume which varies as the plunger element moves toward and away from the dashpot element; and collapsible reservoir means for a substantially incompressible fluid mounted in said bore in the other end of the plunger element which also defines a metering passageway between said reservoir and said enclosed variable volume chamber, said passageway being sized such that fluid passes from the reservoir under urging of the ambient pressure in the steam generator into said chamber as the first and second member move apart as a result of expansion of the steam generator shell under pressure and due to differences in thermal expansion of the first and second members, and fluid is returned to the reservoir as the members cool and the pressure in the steam generator decreases to bring the members closer together, but substantially no fluid passes through said metering passageway in response to the seismic forces so that the plunger element, the dashpot element and the substantially incompressible fluid in the enclosed chamber form a rigid construction which provides a direct load path for the seismic forces between the shell and the internals.

11. The apparatus of claim 10 wherein said bore in the other end of said plunger element is enclosed by contact with said other member and wherein a breather passage is provided between said bore in the plunger element and the space between the shell and the internals.

12. The apparatus of claim 10 wherein said hollow compression spring means is a series of Belleville springs.

* * * * *